(12) United States Patent
Zheng et al.

(10) Patent No.: US 12,741,701 B2
(45) Date of Patent: Sep. 22, 2026

(54) ULTRA-THIN EMBEDDED RIGID COVER WITH SPECIAL FIXING METHOD

(71) Applicant: Yunyan He, Hangzhou (CN)

(72) Inventors: Shaoyong Zheng, Hangzhou (CN); Yunyan He, Hangzhou (CN)

(73) Assignee: Yunyan He, Hangzhou (CN)

( * ) Notice: Subject to any disclaimer, the term of this patent is extended or adjusted under 35 U.S.C. 154(b) by 290 days.

(21) Appl. No.: 18/641,708

(22) Filed: Apr. 22, 2024

(65) Prior Publication Data

US 2025/0256787 A1 Aug. 14, 2025

(30) Foreign Application Priority Data

Feb. 9, 2024 (CN) ........................ 202410178481.9

(51) Int. Cl.
*B62D 33/04* (2006.01)
*B60J 7/14* (2006.01)
*B60J 7/19* (2006.01)

(52) U.S. Cl.
CPC ............ *B62D 33/044* (2013.01); *B60J 7/141* (2013.01); *B60J 7/198* (2013.01)

(58) Field of Classification Search
CPC ...... B62D 33/044; B62D 33/046; B60J 7/141; B60J 7/14; B60J 7/198
USPC .............. 296/136.03, 136.05, 136.1, 136.13, 296/100.16, 100.17, 100.18, 100.06, 296/100.07, 100.08, 100.09, 136.06
See application file for complete search history.

(56) References Cited

U.S. PATENT DOCUMENTS 7,537,264 B2 * 5/2009 Maimin .................... B60P 7/02 296/100.09
11,059,359 B2 * 7/2021 Dylewski, II ............ B60J 7/141
12,503,895 B2 * 12/2025 Muirhead ................ B60J 7/141
2018/0118004 A1 * 5/2018 Schmeichel ............. B60J 7/198
2024/0286473 A1 * 8/2024 Liu ........................ B60J 7/0084
2025/0256786 A1 * 8/2025 Zheng .................. B62D 33/044
2026/0021692 A1 * 1/2026 Zheng ...................... B60J 7/141

* cited by examiner

*Primary Examiner* — Roger L Pang

(57) ABSTRACT

The present invention discloses an ultra-thin embedded hard cover with a special fixing method, including a side rubber strip, a guide rail system, a clamp system, a fixing lock bolt, a plurality of cover plates and a plurality of soft rotating shafts, with a gap between two adjacent cover plates. The cover plate includes a front plate, a first intermediate plate, a second intermediate plate and a small plate, the front plate and the first intermediate plate, the first intermediate plate and the second intermediate plate, the second intermediate plate and the small plate are all connected to each other by soft rotating shafts, the soft rotating shaft is of flexible material or of a material combining flexibility and rigidity.

14 Claims, 9 Drawing Sheets

ULTRA-THIN EMBEDDED RIGID COVER WITH SPECIAL FIXING METHOD

CROSS REFERENCE TO RELATED APPLICATION

This application claims priority benefit of Chinese patent Application No. 202410178481.9, filed on Feb. 9, 2024, and the entire contents of which are incorporated herein by reference.

TECHNICAL FIELD

This invention is relevant to automotive spare parts, especially an ultra-thin embedded rigid cover with special fixing method.

BACKGROUND TECHNOLOGY

Pickup trucks have both car-like comfort and strong power, due to the pickup truck's strong ability to carry cargo and adapt to poor road surface, its comprehensive performance also makes it become one of the common off-road models nowadays.

In order to make the pickup truck to adapt to more diverse environments, most of the existing pickup trucks will be installed cover, the car cover currently available on the market is relatively fixed in the way it is connected, first connecting the guide rails to the car body through a clamp assembly, and then using a tensioning assembly to connect the cover to the guide rails, which has a more complex structure and requires an angle of the parts, in addition to the fact that the existing car cover is thicker overall due to the structure of the rotating axle, which makes it too cumbersome.

ABOUT THE INVENTION

To overcome the deficiencies of the prior art, the present invention provides a tri-fold semi-embedded cover of a front bar with a front extension panel, by changing the connecting structure of the front bar, to solve the above problem.

In order to solve the above problems of the existing technology, the technical solution adopted in the invention is as follows:

An ultra-thin embedded rigid cover with special fixing method, including a side rubber strip, a guide rail system, a clamp system, a fixing lock bolt, a plurality of cover plates and a plurality of soft rotating shafts, with a gap between two adjacent cover plates.

The cover plate includes a front plate, a first intermediate plate, a second intermediate plate and a small plate, the front plate and the first intermediate plate, the first intermediate plate and the second intermediate plate, the second intermediate plate and the small plate are all connected to each other by a soft rotating shaft, the soft rotating shaft is of a flexible material or a material combining flexibility and rigidity, the front plate, the first intermediate plate, the second intermediate plate, the small plate and the soft rotating shaft are connected to a side rubber strip at both ends, the soft rotating shaft is provided with an intermediate connecting bubble, two ends of the front plate, two ends of the first intermediate plate, two ends of the second intermediate plate and two ends of the small plate are connected to a side rail, the side rail is provided with a bonding section, the side rubber strip is provided with a gluing section, the bonding section is bonded to the gluing section;

The fixing lock bolt is arbitrarily connected to the first intermediate plate, the second intermediate plate and the small plate (the arbitrary connection herein means that the fixing lock bolt can be connected to one or more of the above mentioned plates, or it can be arbitrarily connected to any position of the above mentioned plates), the front plate is connected to either a fixing lock bolt or a front plate fixing rod (the front plate can be connected to the fixing lock bolt or the front plate fixing rod, by connecting only one of them, if the front plate fixing rod is connected, it is necessary to arrange the front plate fixing rod on the side of the front plate close to the rear of the car, and if the fixing lock bolt is connected, the fixing lock bolt is arranged on the side of the front plate close to the front end of the car), the front plate is connected to the guide rail by the front plate fixing rod, the clamp system is connected to the guide rail or the car body (the clamp system can clamp the guide rail to the car body, or it can be connected directly to the car body without clamping the guide rail, if the clamp system is connected to the car body directly, a notch is required to be provided in the corresponding position of the guide rail).

The present invention does not set end caps at both ends of the soft rotating shaft, the soft rotating shaft will be directly connected to a side rubber strip on both sides, which can reduce the thickness of the car cover.

An ultra-thin embedded rigid cover with special fixing method, includes a side rubber strip, a guide rail system, a clamp system, a fixing lock bolt, a plurality of cover plates and a plurality of soft rotating shafts;

The cover plate includes a front plate, a first intermediate plate, a second intermediate plate and a small plate, the front plate and the first intermediate plate, the first intermediate plate and the second intermediate plate, the second intermediate plate and the small plate are all connected to each other by a soft rotating shaft, the soft rotating shaft is of a flexible material or a material combining flexibility and rigidity, the front plate, the first intermediate plate, the second intermediate plate, the small plate and the soft rotating shaft are connected to the a side rubber strip at both ends, the soft rotating shaft is provided with an intermediate connecting bubble, two ends of the front plate, two ends of the first intermediate plate, two ends of the second intermediate plate and two ends of the small plate are connected to a side rail, the side rail is provided with a bonding section, the side rubber strip is provided with a gluing section, the bonding section is bonded to the gluing section;

The fixing lock bolt is arbitrarily connected to the first intermediate plate, the second intermediate plate and the small plate (the arbitrary connection here means that the fixing lock bolt can be connected to one or more of the above mentioned plates, or it can be arbitrarily connected to any position of the above mentioned plates), the front plate is connected to either a fixing lock bolt or a front plate fixing rod (the front plate can be connected to either a fixing lock bolt or a front plate fixing rod, by connecting only one of them, if the front plate fixing rod is connected, it is necessary to arrange the front plate fixing rod on the side of the front plate close to the rear of the car, and if the fixing lock bolt is connected, the fixing lock bolt is arranged on the side of the front plate close to the front end of the car); when the car cover is unfolded, the two adjacent cover plates are abutting against each other (the cover plates here include the front plate, the intermediate plate, and the rear bar), the front plate is connected to the guide rail through the front plate fixing rod, the clamp system is connected to the guide rail or the car body (the clamp system can clamp the guide rail and the car body together, or it can be connected to the car body directly without clamping the guide rail, if the clamp system is connected directly to the car body, a notch is required to be provided in the corresponding position of the guide rail).

The pressing rod is connected with a resisting rod, when the car cover is spread, the two resisting rods are pressed against each other.

An ultra-thin embedded rigid cover with special fixing method, includes a side rubber strip, a guide rail system, a clamp system, a fixing lock bolt, a plurality of cover plates and a plurality of soft rotating shafts, with a gap between two adjacent cover plates;

The cover plates includes a front plate, a second intermediate plate and a small plate, the front plate and the first intermediate plate, the first intermediate plate and the second intermediate plate, the second intermediate plate and the small plate are connected to each other by a soft rotating shaft, the soft rotating shaft is of a flexible material or a material combining flexibility and rigidity, the front plate, the second intermediate plate, the small plate and the soft rotating shaft are all connected to a side rubber strip at both ends, the soft rotating shaft is provided with an intermediate connecting bubble, two ends of the front plate, two ends of the second intermediate plate and two ends of the small plate are connected to a side rail, the side rail is provided with an bonding section, the side rubber strip is provided with a gluing section, the bonding section is bonded to the gluing section;

The fixing lock bolt is arbitrarily connected to the second intermediate plate and the small plate, the front plate is connected to the fixing lock bolt or the front plate fixing rod, the front plate is connected to the guide rail through the front plate fixing rod, the clamp system is connected to the guide rail or to the car body (the clamp system can clamp the guide rail and the car body together, or it can be connected to the car body directly without clamping the guide rail, if the clamp system connects to the car body directly, it is necessary to provide a notch in corresponding position of the guide rail).

The intermediate plate can be provided in a plurality of ways or only one, depending on the length of the car cover and the number of folded layers.

An ultra-thin embedded rigid cover with special fixing method, includes a side rubber strip, a guide rail system, a clamp system, a fixing lock bolt, a plurality of cover plates and a plurality of soft rotating shafts.

The cover plate includes a front plate, a second intermediate plate and a small plate, the front plate and the second intermediate plate, the second intermediate plate and the small plate are connected to each other by a soft rotating shaft, the soft rotating shaft is a flexible material or a material combining flexibility and rigidity, the front plate, the second intermediate plate, the small plate and the soft rotating shaft are connected to a side rubber strip at both ends, the soft rotating shaft is provided with an intermediate connecting bubble, two ends of the front plate, two ends of the second intermediate plate and two ends of the small plate are connected to a side rail, the side rail is provided with a bonding section, the side rubber strip is provided with a gluing section, the bonding section is bonded to the gluing section.

The fixing lock bolt is arbitrarily connected to the second intermediate plate and the small plate, the front plate is connected to the fixing lock bolt or the front plate fixing rod, whereby two adjacent cover plates are abutting against each other when the cover is unfolded. The front plate is connected to the guide rail through the front plate fixing rod, the clamp system is connected to the guide rail or to the car body (the clamp system can clamp the guide rail to the car body, or it can be connected to the car body directly without clamping the guide rail, if the clamp system is connected directly to the car body, it is necessary to provide a notch in the corresponding position of the guide rail).

An ultra-thin embedded rigid cover with special fixing method, includes a side rubber strip, a guide rail system, a clamp system, a fixing lock bolt, a plurality of covers and a plurality of soft rotating shafts, with a gap between two adjacent covers;

The soft rotating shaft includes a first soft rotating shaft and a third soft rotating shaft, the first soft rotating shaft is of a width greater or less than the width of the third soft rotating shaft, the soft rotating shaft is of a flexible material or a material combining flexibility and rigidity;

The cover plate includes a front plate, a second intermediate plate and a small plate, the front plate and the second intermediate plate are connected to each other by a first soft rotating shaft, the second intermediate plate and the small plate are connected to each other by a second soft rotating shaft, the front plate, the second intermediate plate, the small plate and the soft rotating shaft are all connected to a side rubber strip at both sides, the soft rotating shaft is provided with an intermediate connecting bubble, two ends of the front plate, two ends of the second intermediate plate and two ends of the small plate are connected to a side rail, the side rail is provided with a bonding section, the side rubber strip is provided with a gluing section, the bonding section is bonded to the gluing section;

The fixing lock bolt is arbitrarily connected to the second intermediate plate and the small plate, the front plate is connected to the fixing lock bolt or the front plate fixing rod, the front plate is connected to the guide rail through the front plate fixing rod, the clamp system is connected to the guide rail or to the car body (the clamp system can clamp the guide rail to the car body, or it can be connected to the car body directly without clamping the guide rail, if the clamp system connects to the car body directly, a notch is required at a corresponding position of the guide rail).

Further, the front plate includes a plate body, a front plate side rail, a front plate front bar, a front plate rear bar, a plate body, a front plate support, a front plate buckle, a front plate rubber strip and a front plate fixing rod, the plate body is surrounded by a front plate front bar, a front plate rear bar and two front plate side rails, the front plate side rails are provided with a rear protrusion and a front protrusion, the rear protrusion is connected to the front plate rear bar, the front protrusion is connected to the front plate front bar, the thickness of the plate body is less than or equal to 10 mm, the front bar support, the front bar buckle and the front plate fixing rod are symmetrically connected to the front plate front bar, the fixing lock bolt is connected to the front plate rear bar, the front plate side rail is provided with a side rail bending hook, the side rubber strip is provided with a bending hook section, the bending hook section is used for hooking the side rail bending hook; the front plate is connected to a guide rail system through a front plate fixing rod, the front plate rubber strip is provided with an extension surface and a front plate rubber strip insertion head, the front plate front bar is provided with a front plate front bar groove, the front plate rubber strip insertion head is clamped with the front plate front bar groove. The front plate side rail are provided with a side rail screw hole, the side rail screw hole is connected to the screw fixing groove by a screw. The frame profiles of the plates are joined together. The front plate consists of a plate body surrounded by four frames, wherein the front plate rear bar is used for connecting a soft rotating shaft, the two front plate side rails are used for connecting a side rubber strips and the guide rails, the plate body in the middle serves as a support, by providing a bending hook at the side rubber strips, it can be fitted with the side rails bending hooks to provide a better connecting effect. the front plate includes a plate body, a front plate side rail, a front plate front bar, a front plate rear bar, a plate body, a front plate support, a front plate buckle, a front plate rubber strip and a front plate fixing rod, the plate body is surrounded by a front plate front bar, a front plate rear bar and two front plate side rails, the front plate side rails are provided with a rear protrusion and a front protruding part, the rear protrusion is connected to the front plate rear bar, the front protrusion is connected to the front plate front bar, the thickness of the plate body is less than or equal to 10 mm, the front bar support, the front bar buckle and the front plate fixing rod are symmetrically connected to the front plate front bar, the fixing lock bolt is connected to the front plate rear bar, the front plate side rail is provided with a side rail bending hook, the side rubber strip is provided with a bending hook section, the bending hook section is used for hooking the side rail bending hook; the front plate is connected to a guide rail system through a front plate fixing rod, the front plate rubber strip is provided with an extension surface and a front plate rubber strip insertion head, the front plate front bar is provided with a front plate front bar groove, the front plate rubber strip insertion head is clamped with the front bar groove of the front plate. The front plate side rail are provided with a side rail screw hole, the side rail screw hole and the screw fixing groove are connected by a screw. The frame profiles of the plates are joined together. The front plate consists of a plate body surrounded by four frames, wherein the rear bar of the front plate is used for connecting a soft rotating shaft, the two front plate side rails are used for connecting the side rubber strips and the guide rails, and the plate body in the middle serves as a support, by providing a bending hook at the side rubber strips, it can be fitted with the side rails bending hooks to provide a better connecting effect.

Further, the small plate includes a rear bar, a small plate body, a small plate side rail, a small plate front bar and a rear bar rubber strip; the rear bar rubber strip is provided with a rear bar rubber strip hole, a rear bar rubber strip insertion head and a rear bar rubber strip adhesive surface, the rear bar is provided with a rear bar profile lower surface and an insertion groove, the rear bar rubber strip insertion head is snapped into the insertion groove, the rear bar rubber strip adhesive surface is glued to the rear bar profile lower surface. The structure of the small plate is similar to the structure of the front plate structure, both of which are constituted by a surrounding frame and a small plate body in the centre, similarly, if the rear bar profile is to be mated with the rear bar rubber strip, a corresponding snap together structure needs to be set up, and the rear bar rubber strip is to be provided with the rear bar rubber strip holes, which are used to increase the amount of compression.

Further, the side rubber strip is provided with a gluing section, a bending hook section, a groove and a lower pressing and bending surface, the gluing section is used for bonding with the side rails and the intermediate rotating shaft. The groove allows the glue strip to have an automatic downward pressure stress, which can enhance the waterproof effect. The lower pressing and bending surface also serves to increase the degree of downward pressure on the side gluing strip. The first soft rotating shaft, the second soft rotating shaft and the third soft rotating shaft are interchangeable, so that the plate is able to be pressed against the front bar support when the cover is folded and standing up.

Further, the soft rotating shaft includes an intermediate connecting bubble, a pressing bar, a snap-in head, and a snap-neck section; the small plate front bar includes a pressing rod, a rod groove, a resisting rod, an upper pressing head, a screw-fixing hole, a plate groove, and an upper plane; the pressing bar is provided on the upper side of the upper plane to enhance waterproofing, the snap-in head is clamped with the rod groove, the pressing rod is deformed and cooperated with the upper pressing head to extrude the snap-neck section, the plate groove is used to connect the plate body, the screw fixing holes are used to connect the side rail by screws. Since the soft rotating shaft is equipped with an intermediate connecting bubble, it greatly increases the expansion and contraction elasticity of the soft rotating shaft, in addition, by connecting the pressing bar with the upper plane, it can play a very good waterproof effect. The structure of the soft rotating shaft can ensure the smoothness of the car cover turning and folding, by setting the rod groove and the pressure bar, it ensures that the two ends of the soft rotating shaft are locked in the inside of the rod groove and not easy to fall off, to form a stable connection with the car cover Further, the clamp system includes a left clamp, a right clamp and a T-rod, the left clamp and the right clamp are connected by screws, the T-rod passes through the left clamp and the right clamp, the T-rod is connected with a nut; the left clamp is connected with a protrusion, the protrusion is provided with front and rear grooves and a snap-in notch, the front and rear grooves and the snap-in port are connected with each other, the left clamp is provided with a waist hole; the right clamp is provided with a threaded hole and a half-waist hole, the screw passes through the waist hole and the screw hole, the T-rod passes through the half-waist hole. The clamp assembly has two main functions, one is to connect the guide rail to the hopper, and the other is to connect the front bar fixing rod, in which the front bar fixing rod is to be used in cooperation with the front and rear grooves, when used, part of the left clamp extends into the rail groove, while the right clamp is located on the outer side of the hopper, the left clamp and the right clamp are connected by screws to clamp the guide rail to the car body, and then longitudinally connect the T-bar to achieve multi-directional positioning of the left clamp and the right clamp, or the clamp system can be clamped directly to the hopper without clamping the guide rail, or the clamp system can be clamped directly to the hopper without clamping guide rails and used to attach the front bar fixing rod only. As the left clamp is provided with front and rear grooves, the front bar fixing rod can be moved back and forth along the front and rear grooves after it is extended into the front and rear grooves, so that it may be fine-tuned according to the position of the front bar.

Further, the guide rail system includes a guide rail, the guide rail includes a guide rail groove, a lock bolt arcing surface, a guide rail support plane and an rubber strip gluing surface, the lock bolt arcing surface is located on the inner side of the guide rail, the guide rail support plane is located on the outer side of the guide rail; the guide rail support plane includes a support upper surface and a support lower surface, the support upper surface is attached to the lower pressing and bending surface, the first guide rail rubber strip includes an rubber strip top surface and an rubber strip gluing surface, the rubber strip top surface is glued to the support lower surface, the rubber strip gluing surface is glued to the guide rail groove. The lock bolt arching surface is connected to the guide rail groove by a guide rail gluing surface, the guide rail gluing surface is provided with a positioning strip, the guide rail gluing surface is bonded with a second guide rail rubber strip, the second guide rail rubber strip is provided along the positioning strip. As the guide rail is connected to both the bucket and the cover, the guide rail should ensure both the stability of the connection and also ensure a certain degree of sealing, so it is necessary to set up a plurality of adhesive strips in the guide rail system, wherein the first guide rail rubber strip is set up on the outer side of the guide rail, the clamp system is located on the first guide rail rubber strip during clamping, which can play a very good anti-slip effect, the second guide rail rubber strip is set up on the inner side of the guide rail to play a waterproof effect and prevent rainwater from entering the hopper, in addition, the side rail rubber strip is located on the upper side of the guide rail, which also plays a certain waterproof effect. Furthermore, a positioning strip is provided on the gluing surface, so that the second guide rail rubber strip can be arranged along the positioning strip when it is installed, avoiding problems of the status quo not being aligned. The guide rail groove is connected to the guide rail resisting block, by connecting the guide rail resisting block in the guide rail groove, the guide rail resisting block holds the lock bolt, so as to limit the lock bolt. The guide rail groove is connected to the guide rail resisting block, by connecting the guide rail resisting block in the guide rail groove, the guide rail resisting block holds the lock bolt, so as to limit the lock bolt. The guide rail resisting block is connected in the guide rail groove, the guide rail resisting block is used to prevent the locking tongue from moving back and forth, the guide rail resisting block is provided with a fixing hole, a inclined resisting surface and a resisting protrusion, the resisting protrusion is used to resist the locking tongue, the inclined resisting surface is used to enable the locking tongue to pass through the guide rail resisting block smoothly.

The beneficial effects of the present invention are:

1, The present invention modifies the traditional connection method of the car cover, and improves the structure of the clamp system, so that it can not only clamp the guide rail, but also use the front and rear grooves to secure the cover plate, meanwhile, it can also directly clamp the cover plate without clamping the guide rail.

2, The present invention cancels the original end structure of the rotating shaft, and designs the cover plate thinner, which makes the overall structure more lightweight.

Figure 1:
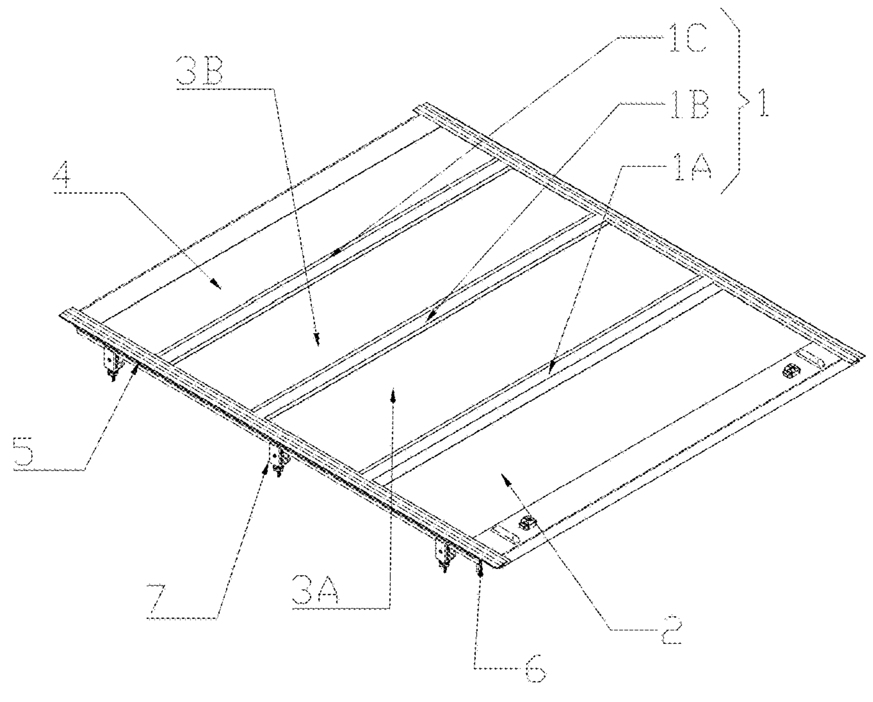
FIG. 1 is a structural schematic diagram I of the present invention.
Figure 2:
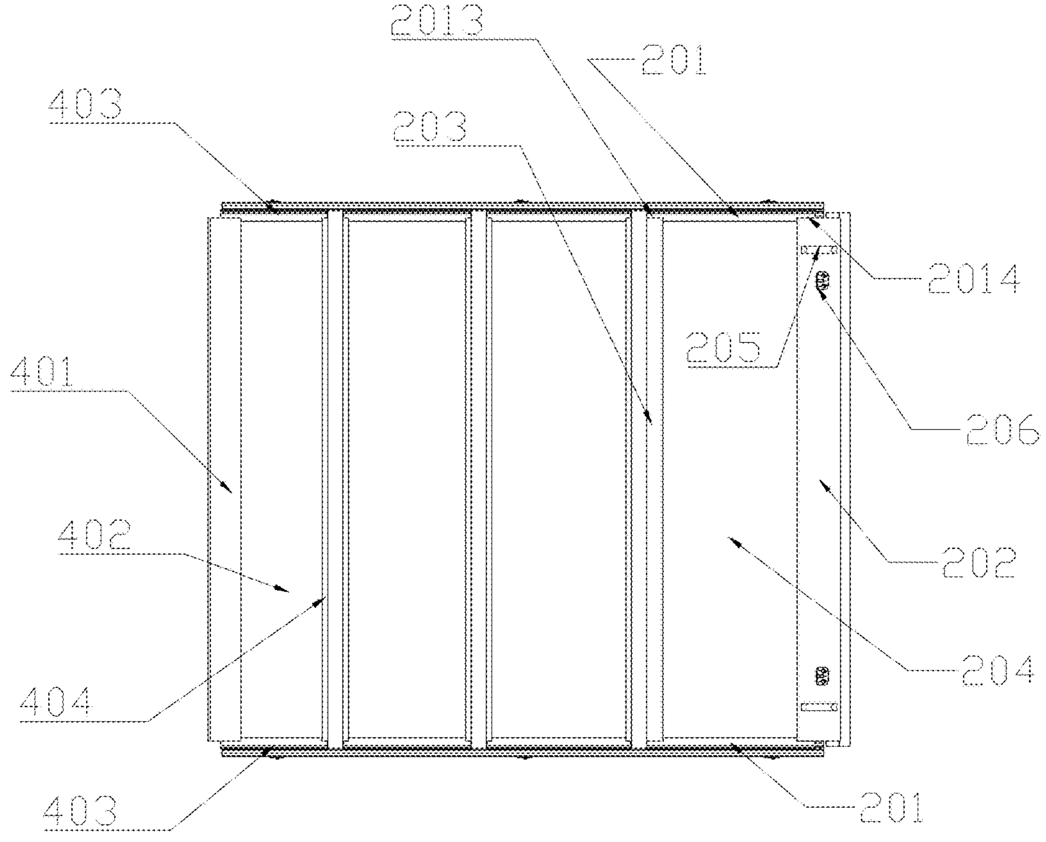
FIG. 2 is a structural schematic diagram II of the present invention.
Figure 3:
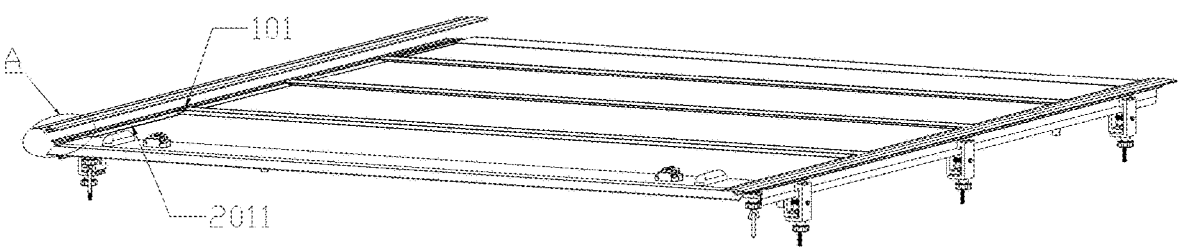
FIG. 3 is a structural schematic diagram III of the present invention.
Figure 4:
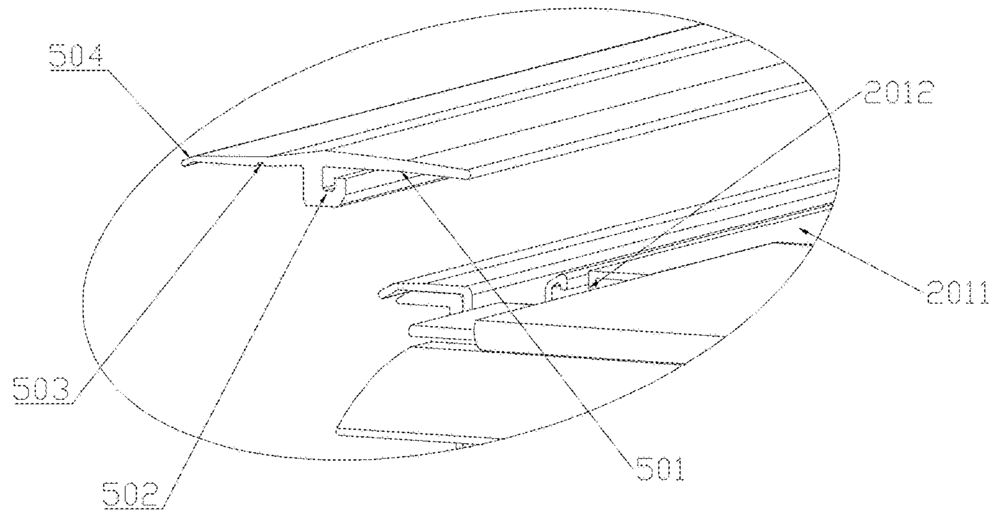
FIG. 4 is a structural schematic diagram of part A in FIG. 3.
Figure 5:
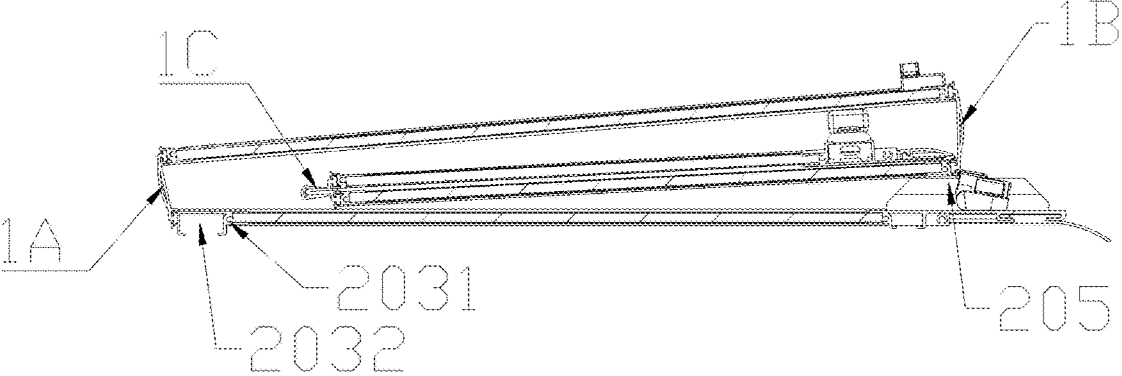
FIG. 5 is a schematic diagram I of the car cover folded.
Figure 6:
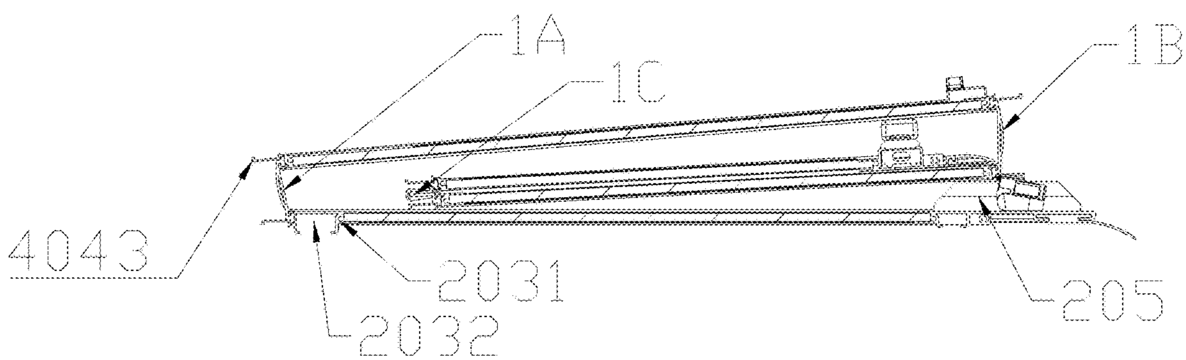
FIG. 6 is a schematic diagram II of the car cover folded.
Figure 7:
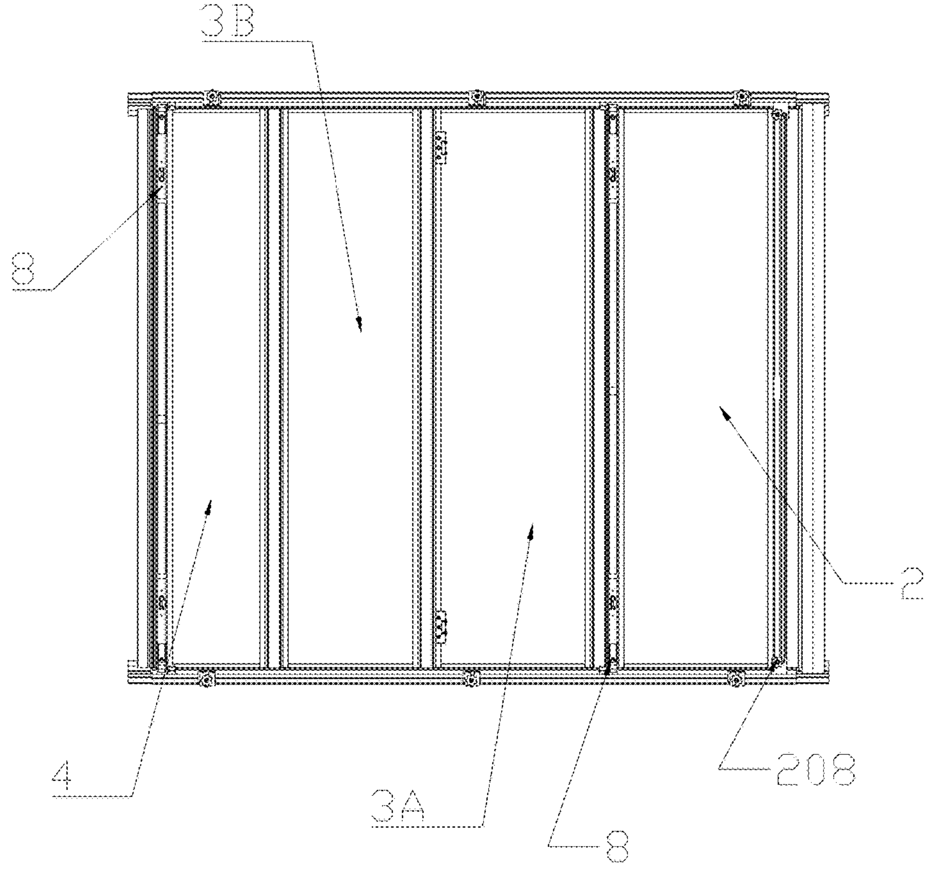
FIG. 7 is a schematic diagram IV of the structure of the present invention.
Figure 8:
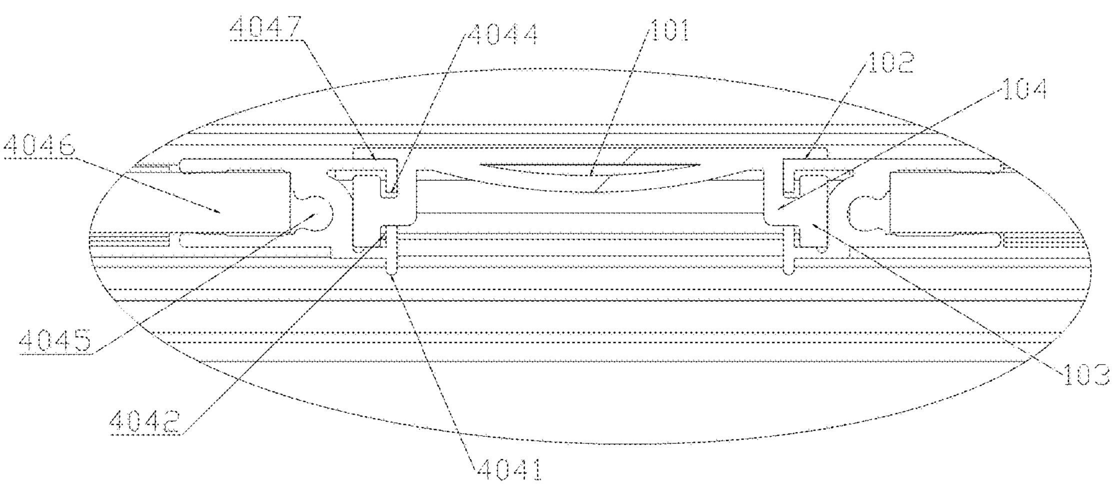
FIG. 8 is a connection schematic diagram I of the soft rotating shaft.
Figure 9:
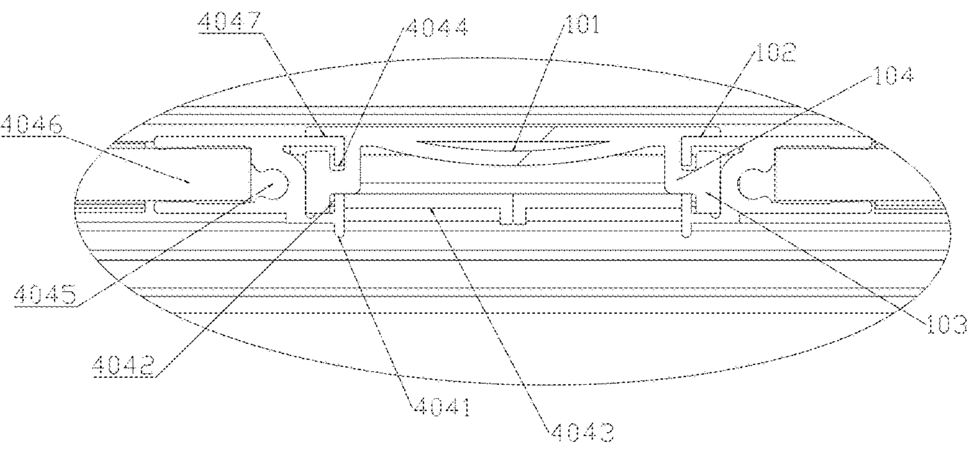
FIG. 9 is a connection schematic diagram II of the soft rotating shaft.
Figure 10:
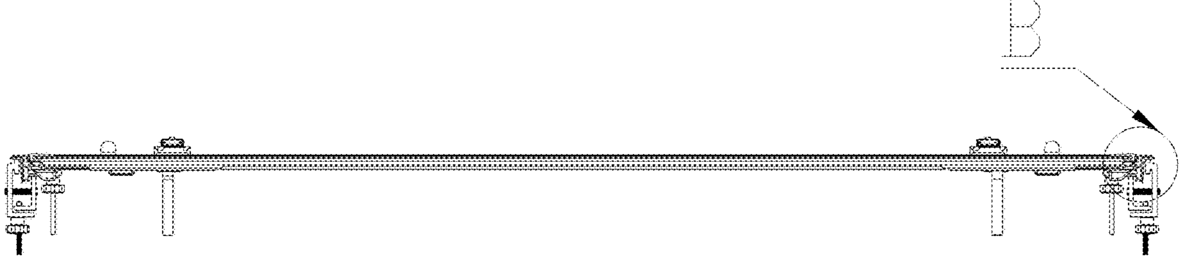
FIG. 10 is a structural schematic diagram V of the present invention.
Figure 11:
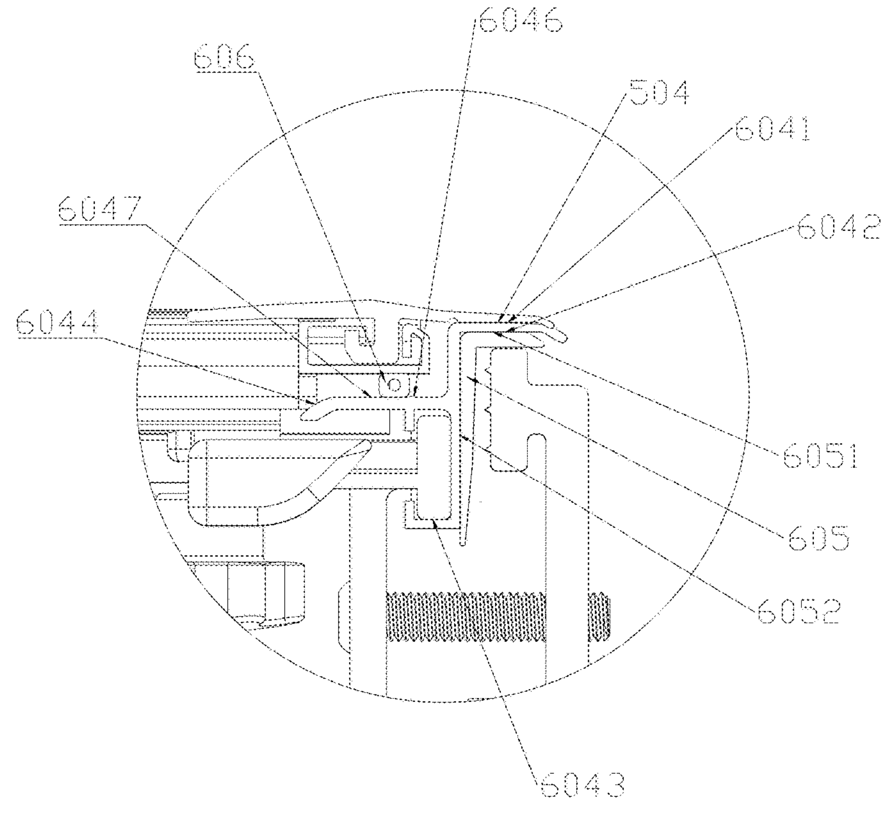
FIG. 11 is a partially enlarged view of part B in FIG. 10.
Figure 12:
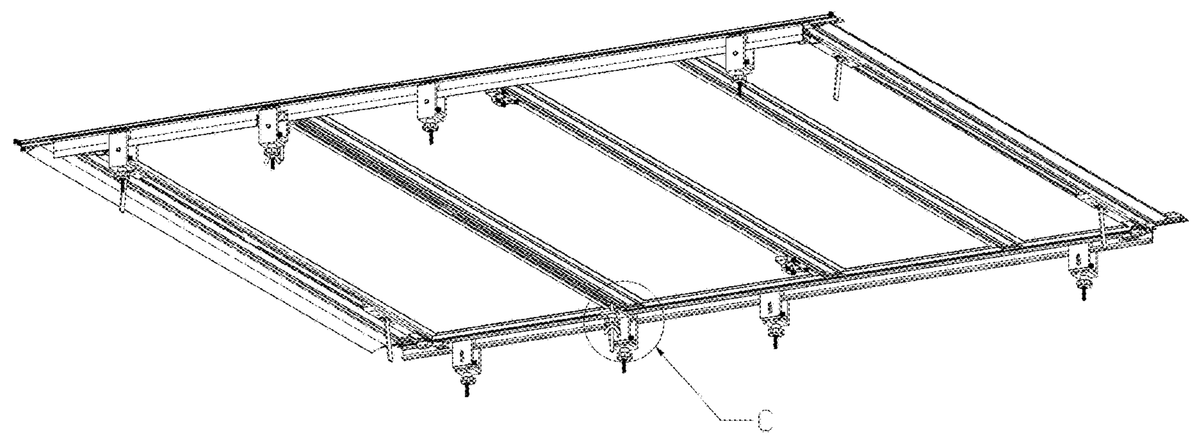
FIG. 12 is a structural schematic diagram VI of the present invention.

Figures: 1—Soft rotating shaft; 1A—First soft rotating shaft; 1B—Second soft rotating shaft; 1C—Third soft rotating shaft; 101—Intermediate connecting bubble; 102—Pressing bar; 103—Snap-in head; 104—Snap-neck part; 2—Front plate; 201—Front plate side rail; 2011—Bonding section; 2012— side rail bending hook; 2013—Rear protrusion; 2014—Front protrusion; 202—Front plate front bar; 2021—Front panel front bar groove; 203—Front panel rear bar; 2031—Screw fixing groove; 2032—Fixing system sliding groove; 204—Plate body; 205—Front bar support; 206—Front bar buckle; 207—Front plate rubber strip; 2071—Extension surface; 2072—Front plate rubber strip insertion head; 208—Front plate fixing rod; 3A—First intermediate plate; 3B—Second intermediate plate; 4—Smaller plate; 401—Rear bar; 402—Small plate body; 403—Small plate side rail; 404—Small plate front bar; 4041—pressing rod; 4042—Bar groove; 4043—resisting rod; 4044—Upper pressing head; 4045—Screw fixing holes; 4046—Plate groove; 4047—Upper plane; 5—Side gluing strip; 501—Gluing section; 502—bending hook section; 503—Recessed groove; 504—Lower pressing and bending surface; 6—Guide rail system; 604—Guide rail; 6041—Supporting upper surface; 6042—Support lower surface; 6043—Guide rail groove; 6044—lock bolt resisting curved surface; 6045—Notch; 6046—Positioning strip; 6047—Applied adhesive surface; 605—First guide rail rubber strip; 6051—Adhesive top surface; 6052—Adhesive sticky surface of the rubber strip; 606—Second guide rail rubber strip; 607—Guide rail resisting block; 6071—Fixing hole; 6072—Inclined resisting surface; 6073—Resisting protrusion; 7—Clamp system; 701—Left clamp; 7011—Protrusion; 7012—Front and rear grooves; 7013—Clamping hole; 7014—Waist hole; 702—Right clamp; 7021—Threaded hole; 7022—Half-waist hole; 703—Screws; 704—T-rod; 7041—Square head; 705—Nut; 706—Butterfly nut; 8—Fixing lock bolt.

The Concrete Method to Carry Out

The following instruction further explains the invention's concrete implementation method.

In order to enable a clearer understanding of the objects mentioned above, features and advantages of the present invention, the invention is described in detail below in connecting with the accompanying Figure and specific embodiments. It should be noted that the embodiments of the present invention and the features in the embodiments can be combined without conflict.

The terms "first", "second", "third", etc. are only used to differentiate the description and should not be construed as indicating or implying relative importance.

In the description of the invention, it should also be noted that, unless otherwise expressly specified and limited, the terms "arranged," "installed," "connected," and "combined" should be understood in a broad sense. for example, it may be a fixing connecting, it can also be a detachable connecting or an integral connecting. it can be a mechanical connecting or an electrical connecting. it can be a direct connecting or an indirect connecting through an intermediate media. And it can be internal connecting within two assemblies. For those of ordinary skill in this field, specific meanings of the above terms in the present invention can be understood in specific situations.

The specific embodiments of the present invention will be described in detail below in connecting with the accompanying Figure. It should be understood that the specific embodiments described herein are intended only to illustrate and explain the present invention and not to limit it.

Embodiment 1

As shown in FIGS. 1-10, an ultra-thin embedded rigid cover with special fixing method includes a side rubber strip 5, a guide rail system 6, a clamp system 7, a fixing lock bolt, a plurality of cover plates, and a plurality of soft rotating shafts 1, with a gap between two adjacent cover plates;

The cover plate includes a front plate 2, a first intermediate plate 3A, a second intermediate plate 3B and a small plate 4, the front plate 2 and the first intermediate plate 3A, the first intermediate plate 3A and the second intermediate plate 3B, and the second intermediate plate 3B and the small plate 4 are connected by a soft rotating shaft 1, the soft rotating shaft 1 is of a flexible material or a material combining flexibility and rigidity, the front plate 2, the first intermediate plate 3A, the second intermediate plate 3B, the small plate 4 and the soft rotating shaft 1 are connected to a side rubber strip 5 at both end, the rotating shaft 1 is provided with an intermediate connecting bubble 101, two ends of the front plate 2, two ends of the first intermediate plate 3A, two ends of the second intermediate plate 3B and two ends of the small plate 4 are connected to a side rail, the side rail is provided with a bonding section 2011, the side rubber strip 5 is provided with a gluing section 501, the bonding section 2011 is bonded to the gluing section 501, the gluing section 501 is bonded to the soft rotating shaft 1, the small plate 4 and the front plate 2 are both connected to a fixing lock bolt 8, the guide rail system 6 is connected with a guide rail resisting block 607, the guide rail resisting block 607 is used for limiting the fixing lock bolt 8.

The fixed lock bolt is arbitrarily connected to the first intermediate plate 3A, the second intermediate plate 3B and the small plate 4 (arbitrarily connected herein means that the fixing lock bolt can be connected to one or more of the above mentioned plates, or it can be arbitrarily connected to any position of the above mentioned plates), the front plate 2 is connected to either a fixing lock bolt or a front plate fixing rod 208 (the front plate 2 can be connected to either a fixing lock bolt or a front plate fixing rod 208, by connecting only one of them. if the front plate fixing rod 208 is connected, it is necessary to arrange the front plate fixing rod 208 on the side of the front plate 2 close to the rear of the car, and if the fixing lock bolt is connected, the fixing lock bolt is arranged on the side of the front plate 2 close to the front end of the car), the front plate 2 is connected to the guide rail 604 by the front plate fixing rod 208, the clamp system 7 is connected to the guide rail 604 or to the car body (the clamp system 7 can clamp the guide rail 604 to the car body, or it can be connected directly to the car without clamping the guide rail 604, if the clamp system 7 is connected to the car body directly, a notch 6045 is required at a corresponding position of the guide rail 604).

The present invention does not set end caps at both ends of the soft rotating shaft 1, the soft rotating shaft will be directly connected to a side rubber strip on both sides, which can reduce the thickness of the car cover.

Embodiment 2

As shown in FIGS. 1-10, an ultra-thin embedded hard cover with special fixing means includes a side rubber strip 5, a guide rail system 6, a clamp system 7, a fixing lock bolt, a plurality of cover plates and a plurality of soft rotating shafts 1;

The cover plate includes a front plate 2, a first intermediate plate 3A, a second intermediate plate 3B and a small plate 4, the front plate 2 and the first intermediate plate 3A, the first intermediate plate 3A and the second intermediate plate 3B, the second intermediate plate 3B and the small plate 4 are all connected to each other by a soft rotating shaft 1, the soft rotating shaft 1 is of a flexible material or a material combining flexibility and rigidity, the front plate 2, the first intermediate plate 3A, the second intermediate plate 3B, the small plate 4 and the soft rotating shaft 1 are connected to side rubber strips 5 at both ends, the rotating shaft 1 is provided with an intermediate connecting bubble 101, two ends of the front plate 2, two ends of the first intermediate plate 3A, two ends of the second intermediate plate 3B and two ends of the small plate 4 are connected to a side rail, the side rail is provided with a bonding section 2011, the side rubber strips 5 are provided with a gluing section 501, the bonding section 2011 is bonded to the gluing section 501, the gluing section 501 is bonded to the soft rotating shaft 1, and the soft rotating shaft 1 is bonded to the soft rotating shaft 1. bonded to the flexible rotating shaft 1, the small plate 4 and front plate 2 are both connected to a fixing lock bolt 8, the guide rail system 6 is connected to a guide rail resisting block 607, the guide rail resisting block 607 is used for limiting the fixing lock bolt 8.

The fixing lock bolt is arbitrarily connected to the first intermediate plate 3A, the second intermediate plate 3B and the small plate 4 (arbitrary connected herein means that the fixing lock bolt can be connected to one or more of the above mentioned plates, or it can be arbitrarily connected to any position of the above mentioned plates), the front plate 2 is connected to either a fixing lock bolt or the front plate fixing rod 208 (the front plate 2 can be connected to either a fixing lock bolt or a front plate fixing rod 208, by connecting only one of them, if the front plate fixing rod 208 is connected, it is necessary to arrange the front plate fixing rod 208 on the side of the front plate 2 near the rear of the car, and if the fixing lock bolt is connected, the fixing lock bolt is arranged on the side of the front plate 2 near the front end of the car); the whereby two adjacent covers are abutting against each other when the cover is unfolded, (the cover plates herein include the front plate 2, the intermediate plate, and the rear rail 401), the front plate 2 is connected to the guide rail 604 through the front plate fixing rod 208, the clamp system 7 is connected to the guide rail 604 or to the car body (the clamp system 7 can clamp the guide rail 604 to the car, or it can be connected to the car body directly without clamping the guide rail 604, if the clamp system 7 is directly connected to the car body, a notch 6045 is required at a corresponding position of the guide rail 604).

The pressing rod 4041 is connected with a resisting rod 4043, when the car cover is spread, the two resisting rods 4043 are pressed against each other.

Embodiment 3

As shown in FIGS. 1-10, an ultra-thin embedded hard cover with special fixing method, includes a side rubber strip 5, a guide rail system 6, a clamp system 7, a fixing lock bolt, a plurality of cover plates and a plurality of soft rotating shafts 1, with a gap between two adjacent cover plates;

The cover plate includes a front plate 2, a second intermediate plate 3B and a small plate 4, the front plate 2 and the second intermediate plate 3B, the second intermediate plate 3B and the small plate 4 are connected to each other by a soft rotating shaft 1, the soft rotating shaft 1 is of a flexible material or a material combining flexibility and rigidity, the front plate 2, the second intermediate plate 3B, the small plate 4 and the soft rotating shafts 1 are connected to a side rubber strip 5 at both ends, the soft rotating shafts 1 are provided with an intermediate connecting bubble 101, two ends of the front plate 2, two ends of the second intermediate plate 3B and two ends of the small plate 4 are all connected to a side rail, the side rail is provided with a bonding section 2011, the side rubber strip 5 is provided with a gluing section 501, the bonding section 2011 is bonded to the gluing section 501, the gluing section 501 is bonded to the soft rotating shaft 1, the small plate 4 and the front plate 2 are both connected to a fixing lock bolt 8, the guide rail system 6 is connected to a guide rail resisting block 607, the guide rail resisting block 607 is used for limiting the fixing lock bolt 8. The guide rail resisting blocks 607 are located on the front and rear sides of the fixing lock bolt 8.

The fixing lock bolt is arbitrarily connected to the second intermediate plate 3B and the small plate 4, the front plate 2 is connected to the fixing lock bolt or to the front plate fixing rod 208, the front plate 2 is connected to the guide rail 604 through the front plate fixing rod 208, the clamp system 7 is connected to the guide rail 604 or to the car body (the clamp system 7 can clamp the guide rail 604 to the car body or it can be connected to the car body directly without clamping the guide rail 604, if the clamp system 7 connects directly to the car body, a notch 6045 is to be provided at a corresponding position of the guide rail 604).

The intermediate plate can be provided in a plurality of ways or only one, depending on the length of the car cover and the number of folded layers.

Embodiment 4

As shown in FIGS. 1-10, an ultra-thin embedded hard cover with special fixing method includes a side rubber strip 5, a guide rail system 6, a clamp system 7, a fixing lock bolt, a plurality of cover plates and a plurality of soft rotating shafts 1.

The cover plate includes a front plate 2, a second intermediate plate 3B and a small plate 4, the front plate 2 and the second intermediate plate 3B, the second intermediate plate 3B and the small plate 4 are connected to each other by a soft rotating shaft 1, the soft rotating shaft 1 is of a flexible material or a material combining flexibility and rigidity, the front plate 2, the second intermediate plate 3B, the small plate 4 and the soft rotating shafts 1 are connected to a side rubber strip 5 at both sides, two ends of the front plate 2, two ends of the second intermediate plate 3B and two ends of the small plate 4 are all connected to a side rail, the side rail is provided with a bonding section 2011, the side rubber strip 5 is provided with a gluing section 501, the bonding section 2011 is bonded to the gluing section 501.

The small plate 4 and the front plate 2 are both connected to a fixing lock bolt 8, the guide rail system 6 is connected to a guide rail resisting block 607, the guide rail resisting block 607 is used for limiting the fixing lock bolt 8. The guide rail resisting blocks 607 are located at the front and rear sides of the fixing lock bolt 8. The front plate 2 is connected to a fixing lock bolt or a front plate fixing rod 208, whereby two adjacent cover plates are abutting against each other when the cover is unfolded. The front plate 2 is connected to the guide rail 604 through the front plate fixing rod 208, the clamp system 7 is connected to the guide rail 604 or the car body (the clamp system 7 can clamp the guide rail 604 to the car body, or it can be connected to the car body directly without clamping the guide rail 604, if the clamp system 7 connects directly to the car body, a notch 6045 is required at a corresponding position of the guide rail 604).

Embodiment 5

As shown in FIGS. 1-10, an ultra-thin embedded hard cover with special fixing method includes a side rubber strip 5, a guide system 6, a clip system 7, a fixing lock bolt, a plurality of cover plates and a plurality of soft rotating shafts 1, with a gap between two adjacent cover plates;

The soft rotating shaft 1 includes a first soft rotating shaft 1A and a third soft rotating shaft 1C, the first soft rotating shaft 1A is of a width greater or less than the width of the third soft rotating shaft 1C, the soft rotating shaft 1 is of a flexible material or a material combining flexibility and rigidity;

The cover plate includes a front plate 2, a second intermediate plate 3B and a small plate 4, the front plate 2 and the second intermediate plate 3B are connected to each other by a first soft rotating shaft 1A, the second intermediate plate 3B and the small plate 4 are connected to each other by a second soft rotating shaft 1B, the front plate 2, the second intermediate plate 3B, the small plate 4 and the soft rotating shaft 1 are connected to a side rubber strip 5 at the ends, the soft rotating shaft 1 is provided with an intermediate connecting bubble 101, two ends of the front plate 2, two ends of the second intermediate plate 3B and two ends of the small plate 4 are connected to a side rail, the side rail is provided with a bonding section 2011, the side rubber strip 5 is provided with a gluing section 501, the bonding section 2011 is bonded to the gluing section 501, the gluing section 501 is bonded to the soft rotating shaft 1, the small plate 4 and the front plate 2 are connected with a fixing lock bolt 8, the guide system 6 is connected with a guide rail resisting block 607, the guide rail resisting block 607 is used for limiting the fixing lock bolt 8. The guide rail resisting blocks 607 are located on the front and rear sides of the fixing lock bolt 8.

The fixing lock bolt is arbitrarily connected to the second intermediate plate 3B and the small plate 4, the front plate 2 is connected to the fixing lock bolt or to the front plate fixing rod 208, the front plate 2 is connected to the guide rail 604 through the front plate fixing rod 208, the clamp system 7 is connected to the guide rail 604 or to the car body (the clamp system 7 can clamp the guide rail 604 to the car body or it can be connected to the car directly without the clamping the guide rail 604, if the clamp system 7 connects directly to the car body, a notch 6045 is required at a corresponding position of the guide rail 604).

Embodiment 6

As shown in FIGS. 1-10, an ultra-thin embedded hard cover with special fixing method includes a side rubber strip 5, a guide rail system 6, a clamp system 7, a fixing lock bolt, a plurality of covers and a plurality of soft rotating shafts 1;

The soft rotating shaft 1 includes a first soft rotating shaft 1A and a third soft rotating shaft 1C, the first soft rotating shaft 1A is of a width greater or less than the width of the third soft rotating shaft 1C, the soft rotating shaft 1 is of a flexible material or a material combining flexibility and rigidity;

The cover plate includes a front plate 2, a second intermediate plate 3B and a small plate 4, the front plate 2 and the second intermediate plate 3B are connected to each other by a first flexible rotating shaft 1A, the second intermediate plate 3B and the small plate 4 are connected to each other by a second flexible rotating shaft 1B, the front plate 2, the second intermediate plate 3B, the small plate 4 and the soft rotating shaft 1 are connected to a side rubber strip 5 at the ends, the soft rotating shaft 1 is provided with an intermediate connecting bubble 101, two ends of the front plate 2, two ends of the second intermediate plate 3B and two ends of the small plate 4 are connected to a side rail, the side rail is provided with a bonding section 2011, the side rubber strip 5 is provided with a gluing section 501, the bonding section 2011 is bonded to the gluing section 501;

The fixing lock bolt is arbitrarily connected to the second intermediate plate 3B and the small plate 4, the front plate 2 is connected to the fixing lock bolt or the front plate fixing rod 208, the two adjacent covers are abutting against each other when the cover is unfolded, the front plate 2 is connected to the guide rail 604 through the front plate fixing rod 208, the clamp system 7 is connected to the guide rail 604 or the car body (the clamp system 7 can clamp the guide rail 604 to the car body, or it can be clamped to the car directly without clamping the guide rail 604, if the clamp system 7 connects directly to the car body, a notch 6045 is required at a corresponding position of the guide rail 604).

Embodiment 7

Figure 13:
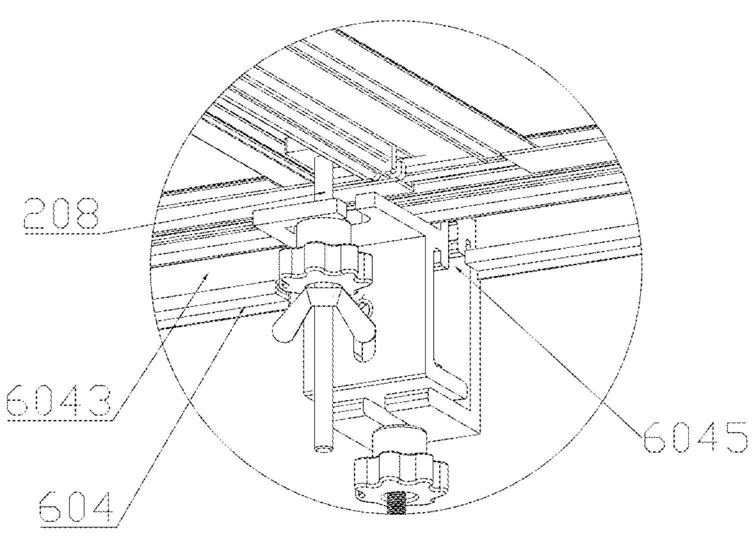
FIG. 13 is a partially enlarged view of part C in FIG. 12.
Figure 20:
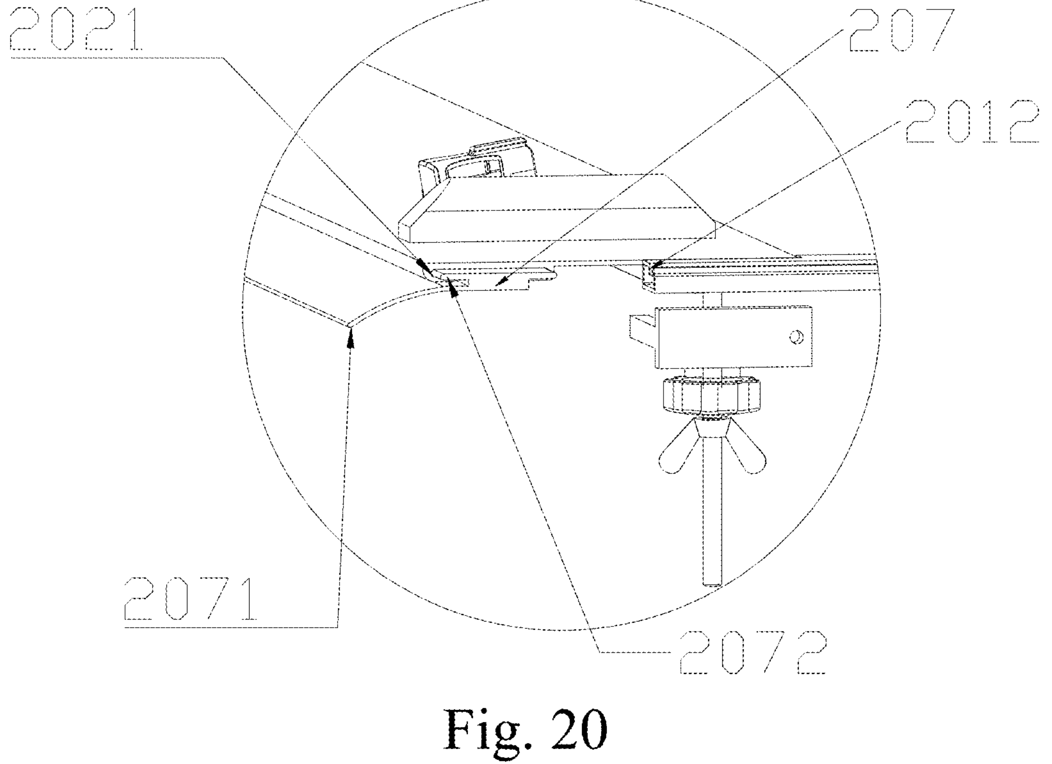
FIG. 20 is a usage schematic diagram of the guide rail resisting block.

On the basis of any one of embodiments 1-6, as shown in FIGS. 13 and 20, the front plate 2 includes a plate body 204, a front plate side rail 201, a front plate front bar 202, a front plate rear bar 203, a plate body 204, a front bar support 205, a front bar buckle 206, a front plate rubber strip 207, and a front plate fixing rod 208, the plate body 204 is surrounded by a front plate front bar 202, a front plate rear bar 401, and two front panel side rails, the front plate side rail 201 is provided with a rear protrusion 2013 and a front protrusion 2014, the rear protrusion 2013 is connected to the front plate rear bar 203, the front protrusion 2014 is connected to the front plate front bar 202, the thickness of the plate body 204 is less than or equal to 10 mm;

The front bar support 205, the front bar buckle 206 and the front plate fixing rod 208 are symmetrically connected to the front plate front bar 202, the fixing lock bolt is the to be connected to the front plate rear bar 203, the front plate side rail 201 is provided with a side rail bending hook 2012, the side rubber strips 5 are provided with a bending hook section 502, the bending hook section 502 is used for hooking the side rail bending hook 2012;

The front plate 2 is connected to the guide rail system 6 through a front plate fixing rod 208, the front plate rubber strip 207 is provided with an extension surface 2071 and a front plate rubber strip insertion head 2072, the front plate front rail 202 is provided with a front plate front rail groove 2021, the front plate rubber strip insertion head 2072 is clamped with the front plate front bar groove 2021.

The front plate rear bar 203 is provided with a screw fixing groove 2031 and a fixing system sliding groove 2032, the fixing system sliding groove 2032 is used to connect the clamp assembly.

The front plate side rail 201 is provided with a side rail screw hole 2015, the side rail screw hole 2015 is connected to the screw fixing groove 2031 by a screw. The frame profiles of the plates are joined together.

The front plate 2 consists of a plate body 204 surrounded by four side rails, wherein the front plate rear bar 203 is used for connecting the soft rotating shaft 1, the two front plate side rails 201 are used for connecting a side rubber strip 5 and a guide rail 604, the plate body 204 in the middle serves as a support, by providing a bending hook 502 at the side rubber strip 5, it can be fitted with the side rail bending hooks 2012 to provide a better connecting effect.

The front plate 2 includes a plate body 204, a front plate side rail 201, a front plate front bar 202, a front plate rear bar 203, a plate body 204, a front bar support 205, a front bar buckle 206, a front plate rubber strip 207, and a front plate fixing rod 208, the plate body 204 is surrounded by a front plate front bar 202, a front plate rear bar 401, and two front panel side rails, the front plate side rail 201 is provided with a rear protrusion 2013 and a front protrusion 2014, the rear protrusion 2013 is connected to the front plate rear bar 203, the front protrusion 2014 is connected to the front plate front bar 202, the thickness of the plate body 204 is less than or equal to 10 mm;

The front bar support 205, the front bar buckle 206 and the front plate fixing rod 208 are symmetrically connected to the front plate front bar 202, the fixing lock bolt is the to be connected to the front plate rear bar 203, the front plate side rail 201 is provided with a side rail bending hook 2012, the side rubber strips 5 are provided with a bending hook section 502, the bending hook section 502 is used for hooking the side rail bending hook 2012;

The front plate 2 is connected to the guide rail system 6 through a front plate fixing rod 208, the front plate rubber strip 207 is provided with an extension surface 2071 and a front plate rubber strip insertion head 2072, the front plate front rail 202 is provided with a front plate front rail groove 2021, the front plate rubber strip insertion head 2072 is clamped with the front plate front bar groove 2021.

The front plate rear bar 203 is provided with a screw fixing groove 2031 and a fixing system sliding groove 2032, the fixing system sliding groove 2032 is used to connect the clamp assembly.

The front plate side rail 201 is provided with a side rail screw hole 2015, the side rail screw hole 2015 is connected to the screw fixing groove 2031 by a screw. The frame profiles of the plates are joined together.

The front plate 2 consists of a plate body 204 surrounded by four side rails, wherein the front plate rear bar 203 is used for connecting the soft rotating shaft 1, the two front plate side rails 201 are used for connecting a side rubber strip 5 and a guide rail 604, the plate body 204 in the middle serves as a support, by providing a bending hook 502 at the side rubber strip 5, it can be fitted with the side rail bending hooks 2012 to provide a better connecting effect.

Embodiment 8

On the basis of any of embodiments 1-6, the small plate 4 includes a rear bar 401, a small plate body 402, a small plate side rail 403, a small plate front bar 404 and a rear bar rubber strip;

The rear bar rubber strip is provided with a rear bar rubber strip hole, a rear bar rubber strip insertion head and a rear bar rubber strip adhesive surface, the rear bar 401 is provided with a rear bar profile lower surface 401 and an insertion groove, the rear bar rubber strip insertion head is snapped into the insertion groove, the rear bar rubber strip adhesive surface is glued to the rear bar profile lower surface 401.

The structure of the small plate 4 is similar to the structure of the front plate 2, both of which are constituted by the surrounding frame and the small plate body 402 in the intermediate, similarly, if the rear bar 401 profile is to be mated with the rear bar rubber strip, a corresponding snap together structure needs to be set up, and the rear bar rubber strip is to be provided with the rear bar rubber strip holes, which are used to increase the amount of compression.

Embodiment 9

On the basis of any of embodiment 1-6, the side rubber strip 5 is provided with a gluing section 501, a bending hook section 502, a groove 503 and a lower pressing and bending surface 504, the gluing section 501 is used for bonding with the side rails and the intermediate rotating shaft. The groove 503 allows the glue strip to have an automatic downward pressure stress, which can increase the waterproof effect. The lower pressing and bending surface 504 also serves to increase the degree of downward pressure on the side gluing strip 5.

The first soft rotating shaft 1A, second soft rotating shaft 1B and third soft rotating shaft 1C are interchangeable, so that the plate is able to be pressed against the front rail support 205 when the cover is folded and standing up.

Embodiment 10

On the basis of any of embodiments 1-6, the soft rotating shaft 1 includes an intermediate connecting bubble 101, a pressing bar 102, a snap-in head 103, and a snap-neck section 104;

The small plate front bar 404 includes a pressing rod 4041, a rod groove 4042, a resisting rod 4043, an upper pressing head 4044, a screw-fixing hole 4045, a plate groove 4046, and an upper plane 4047;

The pressing bar 102 is provided on the upper side of the upper plane 4047 to enhance waterproofing, the snap-in head 103 is clamped with the rod groove 4042, the pressing rod 4041 is deformed and cooperated with the upper pressing head 4044 to extrude the snap-neck section 104, the plate groove 4046 is used to connect the plate body 204, the screw fixing holes 4045 are used to connect the side rail by screws 703.

When installing, the two snap-in heads 103 are extended into a rod groove 4042 to connect the soft rotating shaft 1. Then the pressing rod 4041 is pressed, and the pressing rod 4041 is deformed to clamp the snap-neck section 104, preventing the snap-in heads 103 from slipping out of the rod groove 4042, the pressing bar 102 is covered with the upper plane 4047, which can be bonded by glue.

Since the soft rotating shaft 1 is equipped with an intermediate connecting bubble 101, it greatly increases the expansion and contraction elasticity of the soft rotating shaft 101, in addition, by connecting the pressing bar 102 with the upper plane 4047, it can play a very good waterproof effect.

The structure of the soft rotating shaft 1 can ensure the smoothness of the car cover turning and folding, by setting the rod groove 4042 and the pressure bar 4041, it ensures that the two ends of the soft rotating shaft are locked in the inside of the rod groove 4042 and not easy to fall off, to form a stable connection with the car cover Embodiment 11

Figure 14:
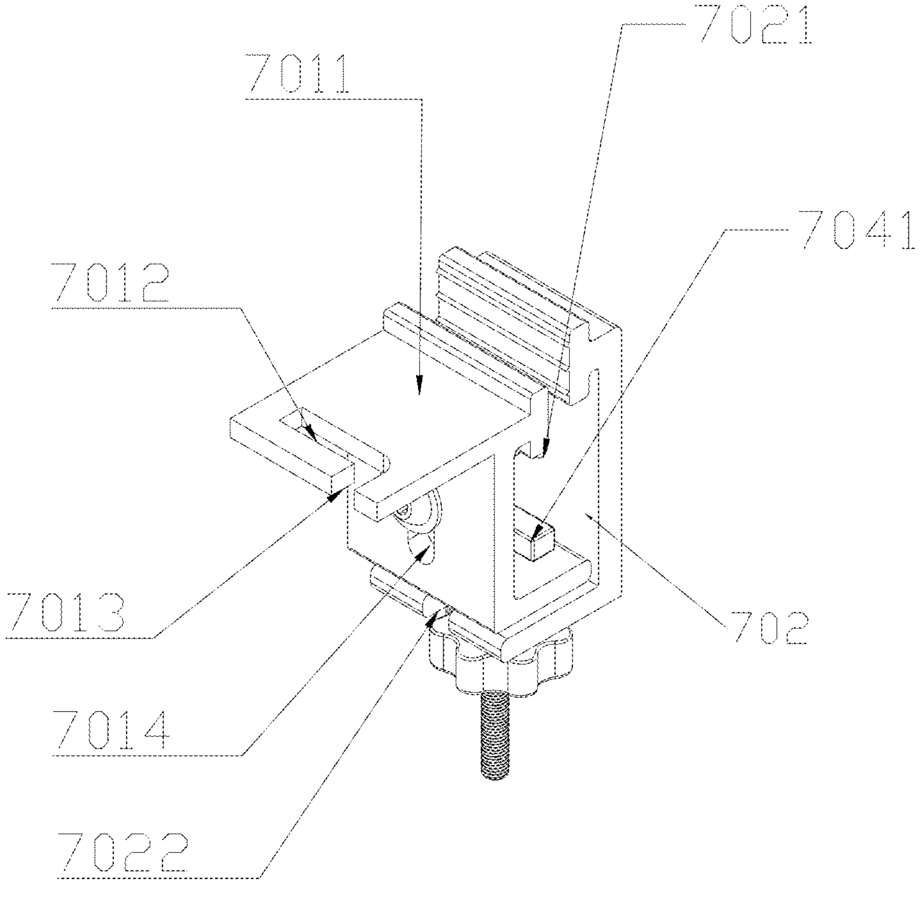
FIG. 14 is a structural schematic diagram I of the clamp system in the present invention.
Figure 15:
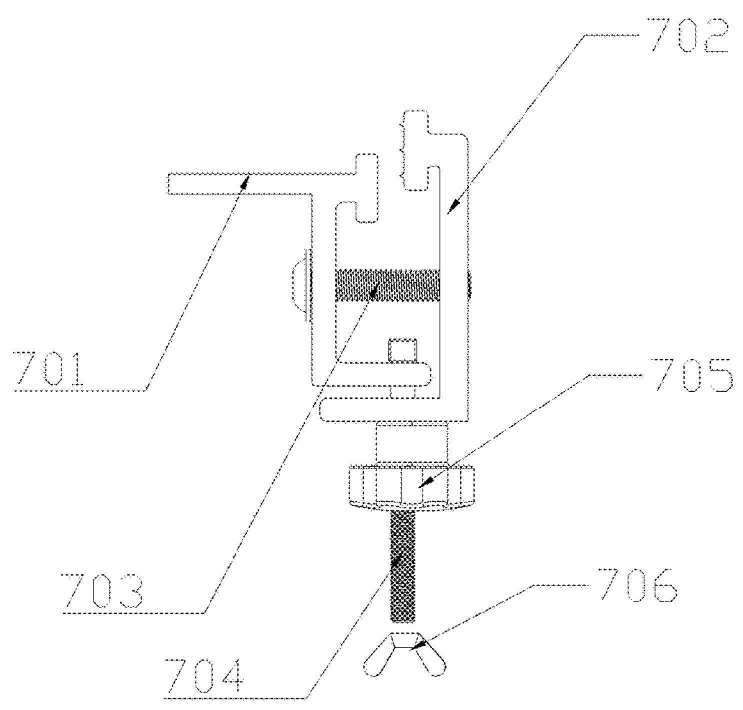
FIG. 15 is a structural schematic diagram II of the clamp system in the present invention.
Figure 16:
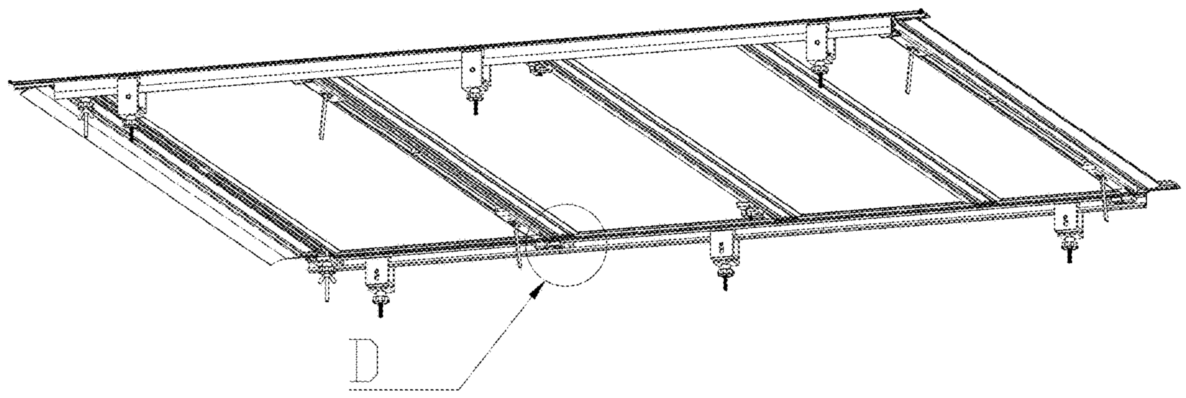
FIG. 16 is a structural schematic diagram VII of the present invention.
Figure 17:
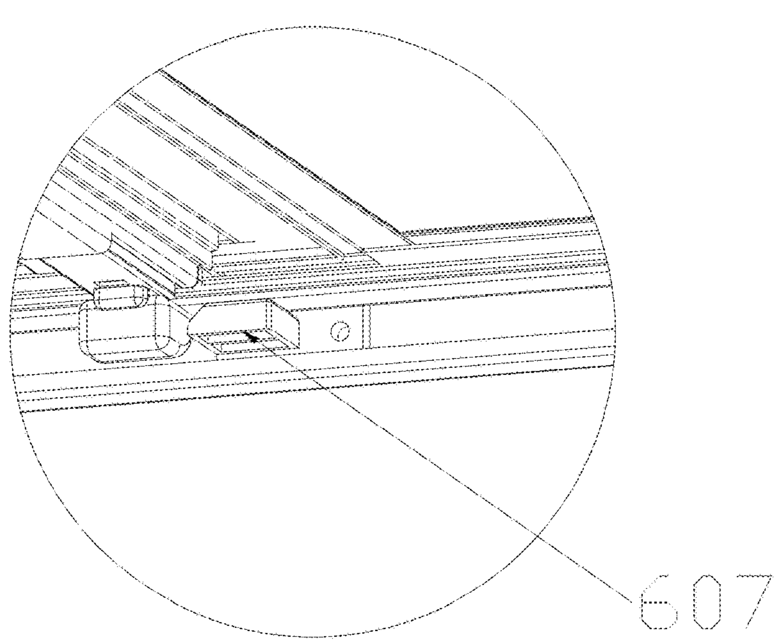
FIG. 17 is a partially enlarged view of part D in FIG. 16.
Figure 18:
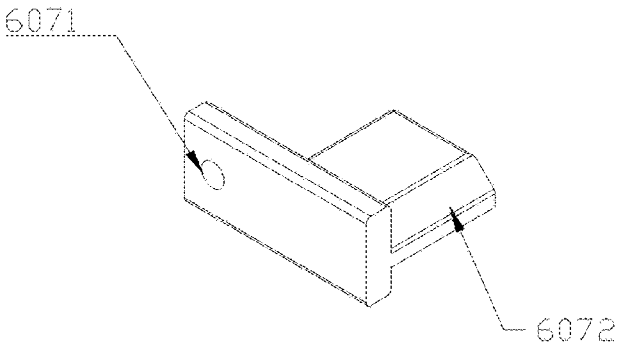
FIG. 18 is a structural schematic diagram I of the guide rail resisting block in the present invention.
Figure 19:
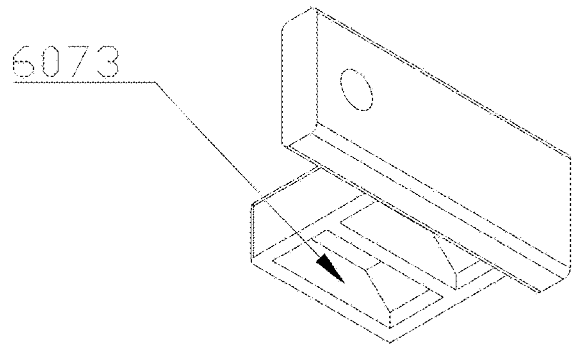
FIG. 19 is a structural schematic diagram II of the guide rail resisting block in the present invention.

On the basis of any of embodiments 1-6, as shown in FIGS. 14 and 15, the clamp system 7 includes a left clamp 701, a right clamp 702 and a T-rod 704, the left clamp 701 and the right clamp 702 are connected by screws 703, the T-rod 704 passes through the left clamp 701 and the right clamp 702, the T-rod 704 is connected with a nut 705 and a butterfly nut 706;

The left clamp 701 is connected with a protrusion 7011, the protrusion 7011 is provided with a front and rear groove 7012 and a clamping hole 7013, the front and rear groove 7012 and the clamping hole 7013 are connected with each other, the left clamp 701 is provided with a waist hole 7014;

The right clamp 702 is provided with a threaded hole 7021 and a half-waist hole 7022, the screw 703 passes through the waist hole 7014 and the screw 703 hole, the T-rod 704 passes through the half-waist hole 7022.

The clamp assembly has two main functions, one is to connect the guide rail 604 to the hopper, and the other is to connect the front bar fixing rod, in which the front bar fixing rod is to be used in cooperation with the front and rear grooves 7012, when in use, part of the left clamp 701 extends into the guide rail groove 6043, while the right clamp 702 is located on the outer side of the hopper, the left clamp 701 and the right clamp 702 are connected by screws 703 to clamp the guide rail 604 to the car body, then longitudinally connect the T-rod 704 to achieve multi-directional positioning of the left clamp 701 and the right clamp 702, or the clamp system 7 can be clamped directly to the hopper without clamping the guide rail 604, or the clamp system can be clamped directly to the hopper without clamping guide rails and used to attach the front bar fixing rod only.

As the left clamp 701 is provided with front and rear grooves 7012, the front bar fixing rod 208 can be moved back and forth along the front and rear grooves 7012 after it is extended into the front and rear grooves 7012, so that it may be fine-tuned according to the position of the front bar 2.

Embodiment 12

On the basis of any of embodiments 1-6, as shown in FIGS. 11, 12, and 16-19, the guide rail system 6 includes a guide rail 604, the guide rail 604 includes a guide rail groove 6043, a lock bolt arcing surface 6044, a guide rail support plane and an rubber strip gluing surface, the lock bolt arcing surface 6044 is located on the inner side of the guide rail 604, the guide rail support plane is located on the outer side of the guide rail 604; the guide rail support plane includes a support upper surface 6041 and a support lower surface 6042, the support upper surface 6041 is attached to the lower pressing and bending surface 504, the first guide rail rubber strip 605 includes an rubber strip top surface 6051 and an rubber strip gluing surface 6052, the rubber strip top surface 6051 is glued to the support lower surface 6042, the rubber strip gluing surface is glued to the guide rail groove 6043.

The lock bolt arching surface 6044 is connected to the guide rail groove 6043 by a guide rail gluing surface 6047, the guide rail gluing surface 6047 is provided with a positioning strip 6046, the guide rail gluing surface 6047 is bonded with a second guide rail rubber strip 606, the second guide rail rubber strip 606 is provided along the positioning strip 6046.

As the guide rail 604 is connected to both the cargo hopper and the cover, the guide rail 604 should ensure both the stability of the connection and also ensure a certain degree of sealing, so it is necessary to set up a plurality of adhesive strips in the guide rail system 6, wherein the first guide rail rubber strip 605 is set up on the outer side of the guide rail 604, the clamp system 7 is located on the first guide rail rubber strip 605 during clamping, which can play a very good anti-slip effect, the second guide rail rubber strip 606 is set up on the inner side of the guide rail 604 to play a waterproof effect and prevent rainwater from entering the hopper, in addition, the side rail rubber strip is located on the upper side of the guide rail 604, which also plays a certain waterproof effect.

Furthermore, a positioning strip 6046 is provided on the gluing surface, so that the second guide rail rubber strip 606 can be arranged along the positioning strip 6046 when it is installed, avoiding problems of the status quo not being aligned.

The guide rail groove 6043 is connected to the guide rail resisting block 607, by connecting the guide rail resisting block 607 in the guide rail groove 6043, the guide rail resisting block 607 holds the lock bolt, so as to limit the lock bolt.

The guide rail groove 6043 is connected to the guide rail resisting block 607, by connecting the guide rail resisting block 607 in the guide rail groove 607, the guide rail resisting block 607 holds the lock bolt, so as to limit the lock bolt.

The guide rail resisting block 607 is connected in the guide rail groove 6043, the guide rail resisting block 607 is used to prevent the locking tongue from moving back and forth, the guide rail resisting block 607 is provided with a fixing hole 6071, a inclined resisting surface 6072 and a resisting protrusion 6073, the resisting protrusion 6073 is used to resist the locking tongue, the inclined resisting surface 6072 is used to enable the locking tongue to pass through the guide rail resisting block 607 smoothly.

Embodiment 13

On the basis of embodiments 1-6, the front plate 2 is connected to a front plate fixing rod 208, the front plate fixing rod 208 is connected to the tail of the front plate 2, the fixing lock bolt 8 is connected to the head of the front plate 2, the second intermediate plate 3B is connected to the fixing lock bolt 8, the first intermediate plate 3A and the second intermediate plate 3B may or may not be connected to the fixing lock bolt 8. at least one of the first intermediate plate 3B and the second intermediate plate 3B is connected to the fixing lock bolt 8.

The invention is not limited to the above-mentioned optional embodiments. Anyone can come up with various other forms of products under the inspiration of the invention, however, regardless of any changes in its shape or structure. All technical solutions that fall within the scope defined by the claims of the present invention shall fall within the scope of protection of the invention.

What is claimed is:

1. An ultra-thin embedded rigid cover with special fixing method, wherein, it includes a side rubber strip (5), a guide rail system (6), a clamp system (7), a fixing lock bolt (8), a plurality of cover plates and a plurality of soft rotating shafts (1), with a gap between two adjacent cover plates; The cover plate includes a front plate (2), a first intermediate plate (3A), a second intermediate plate (3B) and a small plate (4), the front plate (2) and the first intermediate plate (3A), the first intermediate plate (3A) and the second intermediate plate (3B), the second intermediate plate (3B) and the small plate (4) are all connected to each other by soft rotating shafts (1), the soft rotating shaft (1) is of a flexible material or of a material combining flexibility and rigidity, the front plate (2), the first intermediate plate (3A), the second intermediate plate (3B), the small plate (4) and the soft rotating shaft (1) are connected to a side rubber strip (5) at both ends, two ends of the front plate (2), two ends of the first intermediate plate (3A), two ends of the second intermediate plate (3B) and two ends of the small plate (4) are connected to a side rail, the side rail is provided with a bonding section (2011), the side rubber strip (5) is provided with a gluing section (501), the bonding section (2011) is bonded to the gluing section (501), the gluing section (501) is bonded to the soft rotating shaft (1); The small plate (4) and front plate (2) are each connected with the fixing lock bolt (8), the guide rail system (6) is connected with a guide rail resisting block (607), the guide rail resisting block (607) is used for limiting the fixing lock bolt (8).

2. An ultra-thin embedded rigid cover with special fixing method, wherein, it includes a side rubber strip (5), a guide rail system (6), a clamp system (7), a fixing lock bolt (8), a plurality of cover plates and a plurality of soft rotating shafts (1); The cover plate includes a front plate (2), a first intermediate plate (3A), a second intermediate plate (3B) and a small plate (4), the front plate (2) and the first intermediate plate (3A), the first intermediate plate (3A) and the second intermediate plate (3B), the second intermediate plate (3B) and the small plate (4) are all connected to each other by a soft rotating shaft (1), the soft rotating shaft (1) is of flexible material or of a material combining flexibility and rigidity, the front plate (2), the first intermediate plate (3A), the second intermediate plate (3B), the small plate (4) and the soft rotating shaft (1) are connected to a side rubber strip (5) at both ends, two ends of the front plate (2), two ends of the first intermediate plate (3A), two ends of the second intermediate plate (3B) and two ends of the small plate (4) are connected to a side rail, the side rail is provided with a bonding section (2011), the side rubber strip (5) is provided with a gluing section (501), the bonding section (2011) is bonded to the gluing section (501), the gluing section (501) is bonded to the soft rotating shaft (1); The small plate (4) and the front plate (2) are each connected with the fixing lock bolt (8), the guide rail system (6) is connected with a guide rail resisting block (607), the guide rail resisting block (607) is used for limiting the fixing lock bolt (8), the two adjacent covers are restrained against each other when the car cover is unfolded.

3. An ultra-thin embedded hard cover with special fixing method, wherein, it includes a side rubber strip (5), a guide rail system (6), a clamp system (7), a fixing lock bolt (8), a plurality of cover plates and a plurality of soft rotating shafts (1), with a gap between two adjacent cover plates; The cover plate includes a front plate (2), a second intermediate plate (3B) and a small plate (4), the front plate (2) and the second intermediate plate (3B), the second intermediate plate (3B) and the small plate (4) are all connected to each other by a soft rotating shaft (1), the soft rotating shaft (1) is of a flexible material or a material combining flexibility and rigidity, the front plate (2), the second intermediate plate (3B), the small plate (4) and the soft rotating shaft (1) are all connected to a side rubber strip (5) at both ends, two ends of the front plate (2), two ends of the second intermediate plate (3B) and two ends of the small plate (4) are connected to a side rail, the side rail is provided with a bonding section (2011), the side rubber strip (5) is provided with a gluing portion (501), the bonding section (2011) is bonded with the gluing section (501) the gluing section (501) is bonded with the soft rotating shaft (1); The small plate (4) and the front plate (2) are each connected with the fixing lock bolt (8), the guide rail system (6) is connected with a guide rail resisting block (607), the guide rail resisting block (607) is used for limiting the fixing lock bolt (8).

4. An ultra-thin embedded rigid cover with special fixing method, wherein, it includes a side rubber strip (5), a guide rail system (6), a clamp system (7), a fixing lock bolt (8), a plurality of cover plates and a plurality of soft rotating shafts (1); The cover plate includes a front plate (2), a second intermediate plate (3B) and a small plate (4), the front plate (2) and the second intermediate plate (3B), the second intermediate plate (3B) and the small plate (4) are all connected to each other by a soft rotating shaft (1), the soft rotating shaft (1) is of a flexible material or a material combining flexibility and rigidity, the front plate (2), the second intermediate plate (3B), the small plate (4) and the soft rotating shafts (1) are all connected to a side rubber strip (5) at both ends, two ends of the front plate (2), two ends of the second intermediate plate (3B) and two ends of the small plate (4) are connected to a side rail, the side rail is provided with a bonding section (2011), the side rubber strip (5) is provided with a gluing portion (501), the bonding section (2011) is bonded with the gluing section (501) the gluing section (501) is bonded with the soft rotating shaft (1); The small plate (4) and the front plate (2) are each connected with the fixing lock bolt (8), the guide rail system (6) is connected with a guide rail resisting block (607), the guide rail resisting block (607) is used for limiting the fixing lock bolt (8), the two adjacent covers are abutting against each other when the car cover is unfolded.

5. An ultra-thin embedded rigid cover with special fixing method, wherein, it includes a side rubber strip (5), a guide rail system (6), a clamp system (7), a fixing lock bolt (8), a plurality of cover plates and a plurality of soft rotating shafts (1), with a gap between two adjacent cover plates; The soft rotating shaft (1) includes a first soft rotating shaft (1A) and a third soft rotating shaft (1C), the first soft rotating shaft (1A) is of a width greater than or less than the width of the third soft rotating shaft (1C), the soft rotating shafts (1) are of a flexible material or of a material combining flexibility and rigidity; The cover plate includes a front plate (2), a second intermediate plate (3B) and a small plate (4), the front plate (2) and the second intermediate plate (3B) are connected to each other by a first soft rotating shaft (1A), the second intermediate plate (3B) and the small plate (4) are connected to each other by a second soft rotating shaft (1B), the front plate (2), the second intermediate plate (3B), the small plate (4) and the soft rotating shaft (1) are all connected to a side rubber strip (5) at both ends, two ends of the front plate (2), two ends of the second intermediate plate (3B) and two ends of the small plate (4) are connected to a side rail, the side rail is provided with a bonding section (2011), the side rubber strip (5) is provided with a gluing section (501), the bonding section (2011) is glued to the gluing section (501), the gluing section (501) is bonded to the soft rotating shaft (1); The small plate (4) and the front plate (2) are each connected with the fixing lock bolt (8), the guide rail system (6) is connected with a guide rail resisting block (607), the guide rail resisting block (607) is used for limiting the fixing lock bolt (8).

6. An ultra-thin embedded rigid cover with special fixing method, wherein, it includes a side rubber strip (5), a guide rail system (6), a clamp system (7), a fixing lock bolt (8), a plurality of cover plates and a plurality of soft rotating shafts (1); The soft rotating shafts (1) include a first soft rotating shaft (1A) and a third soft rotating shaft (1C), the first soft rotating shaft (1A) is of a width greater than or less than the width of the third soft rotating shaft (1C), the soft rotating shafts (1) are of flexible material or of a material combining flexibility and rigidity; The cover plate includes a front plate (2), a second intermediate plate (3B) and a small plate (4), the front plate (2) and the second intermediate plate (3B) are connected to each other by a first soft rotating shaft (1A), the second intermediate plate (3B) and the small plate (4) are connected to each other by a second soft rotating shaft (1B), the front plate (2), the second intermediate plate (3B), the small plate (4) and the soft rotating shaft (1) are connected to a side rubber strip (5) at both ends, two ends of the front plate (2), two ends of the second intermediate plate (3B) and two ends of the small plate (4) are connected to a side rail, the side rail is provided with a bonding section (2011), the side rubber strip (5) is provided with a gluing section (501), the bonding section (2011) is bonded with the gluing section (501), the gluing section (501) is bonded with the soft rotating shaft (1); The small plate (4) and front plate (2) are each connected with the fixing lock bolt (8), the guide rail system (6) is connected with a guide rail resisting block (607), the guide rail resisting block (607) is used for limiting the fixing lock bolt (8), the two adjacent covers are abutting each other when the car cover is unfolded.

7. An ultra-thin embedded rigid cover with special fixing method according to any one of claims 1-6, wherein, the front plate (2) includes a plate body (204), a front plate side rail (201), a front plate front bar (202), a front plate rear bar (203), a plate body (204), a front bar support (205), a front bar buckle (206), a front plate rubber strip (2) and a front plate fixing rod (208), the plate body (204) is surrounded by a front plate front bar (202), a front plate rear bar (401) and two front plate side rails, the front plate side rail (201) is provided with a rear protrusion (2013) and a front protrusion (2014), the rear protrusion (2013) is connected to the front plate rear bar (203), the front protrusion (2014) is connected to the front plate front bar (202), the thickness of the plate body (204) is less than or equal to 10 mm;

The front bar support (205), the front bar buckle (206) and the front plate fixing rod (208) are symmetrically connected to the front plate front bar (202), the fixing lock bolt (8) is connected to the front plate rear bar (203), the front plate side rail (201) is provided with a side rail bending hook (2012), the side rubber strip (5) is provided with a bending hook section (502), the bending hook section (502) is used for hooking the side rail bending hook (2012);

The front plate (2) is connected to the guide rail system (6) by a front plate fixing rod (208).

8. An ultra-thin embedded rigid cover with special fixing method according to any one of claims 1, 3 and 5, wherein, the soft rotating shaft (1) includes an intermediate connecting bubble (101), a pressing bar (102), a snap-in head (103), and a snap-in neck section (104);

A small plate front bar (404) includes a pressing rod (4041), a rod groove (4042), an upper pressing head (4044), a screw fixing hole (4045), a snap-in plate groove (4046), and an upper plane (4047);

The pressing bar (102) is provided on the upper side of the upper plane (4047) to enhance waterproofing, the snap-in head (103) is clamped with the rod groove (4042), the pressing rod (4041) is deformed and cooperated with the upper pressing head (4044) to extrude the snap-neck section (104), the plate groove (4046) is used to connect the plate body (204), the screw fixing holes (4045) are used to connect the side rail by screws (703).

9. An ultra-thin embedded rigid cover with special fixing method according to any one of claims 2, 4 and 6, wherein, the soft rotating shaft (1) includes an intermediate connecting bubble (101), a pressing bar (102), a snap-in head (103), and a snap-in neck section (104);

A small plate front bar (404) includes a pressing rod (4041), a rod groove (4042), a resisting rod (4043), an upper pressing head (4044), a screw fixing hole (4045), a snap-in plate groove (4046) and an upper plane (4047);

The pressing rod (4041) is connected with a resisting rod (4043), the pressing bar (102) is provided on the upper side of the upper plane (4047) to act as a waterproof, the snap-in head (103) is clamped with the rod groove (4042), the pressing rod (4041) squeezes the snap-neck section (104) in cooperation with the upper pressing head (4044) after deformation, the snap-in plate groove (4046) is used to connect the plate body (204), the screw fixing holes (4045) are used to connect the side rails by screws (703).

10. An ultra-thin embedded rigid cover with special fixing method according to any one of claims 1-6, wherein, the clamp system (7) includes a left clamp (701), a right clamp (702) and a T-rod (704), the left clamps (701) and the right clamps (702) are connected by screws (703), the T-rod (704) passes through the left clamp (701) and the right clamp (702), the T-rod (704) is connected with a nut (705);

The left clamp (701) is provided with a protrusion (7011), the protrusion (7011) is provided with front and rear grooves (7012) and the snap-in opening (7013), the front and rear grooves (7012) and the snap-in notch (7013) are connected to each other, the left clamp (701) is provided with a waist hole (7014);

The right clamp (702) is provided with a threaded hole (7021) and a half-waist hole (7022), the screw (703) passes through the waist hole (7014) and the screw (703) hole, the T-rod (704) passes through the half-waist holes (7022).

11. An ultra-thin embedded rigid cover with special fixing method according to any one of claims 1-6, wherein, the guide rail system (6) includes a guide rail (604), the guide rail (604) includes a guide rail groove (6043), a lock bolt arching surface (6044) and a guide rail support plane, the lock bolt arching surface (6044) is located on a inner side of the guide rail (604), the guide rail support plane (604) is located on a outer side of the guide rail (604);

The guide rail support plane includes a support upper surface (6041) and a support lower surface (6042), the support upper surface (6041) is attached to the lower pressing and bending surface (504), the first guide rail rubber strip (605) includes a rubber strip top surface (6051) and a rubber strip gluing surface (6052), the rubber strip top surface (6051) is glued to the support lower surface (6042), the rubber strip gluing surface (6052) is glued to the guide rail groove (6043);

The lock bolt arching surface (6044) is connected to the guide rail groove (6043) by an gluing surface (6047), the gluing surface (6047) is provided with a positioning strip (6046), the gluing surface (6047) is bonded with a second guide rail rubber strip (606), the second guide rail rubber strip (606) is provided along the positioning strip (6046).

12. An ultra-thin embedded hard cover with special fixing method according to any one of claims 1-6, wherein, a guide rail groove (6043) is connected to a guide rail resisting block (607), the guide rail resisting block (607) is provided with a fixing hole (6071), an inclined resisting surface (6072), and a resisting protrusion (6073).

13. An ultra-thin embedded rigid cover with special fixing method according to any one of claims 1-6, wherein, the front plate (2) is connected to a front plate fixing rod (208), the front plate fixing rod (208) is connected to a tail part of the front plate (2), the front plate fixing rod (208) extends into the front and rear grooves (7012) and the snap-in opening (7013), and slides along the front and rear grooves (7012) and the snap-in opening (7013), the clamp system (7) is connected to the guide rail (604) or to a car body, the fixing lock bolt (8) is connected to a head of the front plate (2).

14. An ultra-thin embedded rigid cover with special fixing method according to any one of claims 1-2, wherein, at least one of a first intermediate plate (3A) or the second intermediate plate (3B) is connected with a fixing lock bolt (8).

* * * * *